(12) United States Patent
Potter et al.

(10) Patent No.: US 11,378,327 B2
(45) Date of Patent: Jul. 5, 2022

(54) REFRIGERATOR APPLIANCE AND METHOD OF FORMING REFRIGERATOR APPLIANCE USING ULTRASONIC WELDING

(71) Applicant: Electrolux Home Products, Inc., Charlotte, NC (US)

(72) Inventors: Glen Potter, Anderson, SC (US); Andrew D. Brown, Anderson, SC (US); Matt Reynolds, Anderson, SC (US)

(73) Assignee: Electrolux Home Products, Inc., Charlotte, NC (US)

( * ) Notice: Subject to any disclaimer, the term of this patent is extended or adjusted under 35 U.S.C. 154(b) by 30 days.

(21) Appl. No.: 16/739,372

(22) Filed: Jan. 10, 2020

(65) Prior Publication Data
US 2021/0215415 A1    Jul. 15, 2021

(51) Int. Cl.
*F25D 23/06* (2006.01)
*B29C 69/00* (2006.01)
*B29L 31/00* (2006.01)

(52) U.S. Cl.
CPC ............ *F25D 23/066* (2013.01); *B29C 69/00* (2013.01); *B29L 2031/7622* (2013.01); *F25D 2201/10* (2013.01)

(58) Field of Classification Search
CPC . F25D 23/066; B29C 69/00; B29L 2031/7622
See application file for complete search history.

(56) References Cited

U.S. PATENT DOCUMENTS

| 4,509,335 A | 4/1985 | Griffin et al. |
| 8,048,510 B2 | 11/2011 | Egan et al. |
| 8,732,943 B2 | 5/2014 | Egan et al. |
| (Continued) | | |

FOREIGN PATENT DOCUMENTS

| DE | 102011118512 | 5/2013 |
| WO | 20090131933 | 10/2009 |
| (Continued) | | |

OTHER PUBLICATIONS

International Search Report for PCT/US2021/012148, dated Apr. 22, 2021, 2 pages.

*Primary Examiner* — Daniel J Rohrhoff
(74) *Attorney, Agent, or Firm* — Pearne & Gordon LLP (57) ABSTRACT

A method of manufacturing a refrigerator appliance includes a providing step of providing a liner and a refrigerator component. The liner defines a compartment for storing food items and includes a liner contact structure. The refrigerator component includes component contact structure. The method further includes a staging step that includes arranging the liner and refrigerator component such that the liner and component contact structures are in direct contact with each other under pressure, thereby forming a staged assembly. Moreover, the method includes a welding step that includes applying ultrasonic energy to the staged assembly to weld the liner and refrigerator component together at their interface, thereby forming a liner assembly. The method further includes a cabinet assembly step that includes arranging the liner assembly within an outer shell, and then injecting an insulating foam into a space between the liner assembly and outer shell.

16 Claims, 10 Drawing Sheets

(56) References Cited

U.S. PATENT DOCUMENTS

| | | | |
|---|---|---|---|
| 9,505,150 B2 | 11/2016 | Cook | |
| 9,551,524 B2 | 1/2017 | Egan et al. | |
| 2007/0001563 A1* | 1/2007 | Park | F25D 23/064 312/406 |
| 2011/0031254 A1* | 2/2011 | Mortarotti | F25D 23/064 220/592.2 |
| 2013/0257257 A1* | 10/2013 | Cur | B29C 65/002 312/406.1 |
| 2015/0102716 A1* | 4/2015 | Cook | F25D 23/066 312/401 |
| 2015/0143697 A1* | 5/2015 | Cook | B29C 39/10 29/890.035 |
| 2017/0214064 A1* | 7/2017 | Lex | H01M 8/1039 |
| 2018/0266754 A1* | 9/2018 | Hottmann | F25D 23/025 |
| 2019/0113275 A1* | 4/2019 | Jorapur | F25D 23/066 |
| 2019/0128593 A1* | 5/2019 | Deka | F25D 23/06 |
| 2020/0371505 A1* | 11/2020 | Gentile | F25D 23/066 |

FOREIGN PATENT DOCUMENTS

| | | |
|---|---|---|
| WO | 2013183261 | 12/2013 |
| WO | 2014112010 | 1/2017 |
| WO | 2019025003 | 2/2019 |

\* cited by examiner

|  | Tensile Strength (ksi) | | |
|---|---|---|---|
|  | Welded Samples | Taped Samples | Glued Samples |
|  | 0.65 | 0.54 | 0.32 |
|  | 1.01 | 0.55 | 0.29 |
|  | 0.80 | 0.55 | 0.22 |
|  | 0.88 | 0.49 | 0.31 |
|  | 0.39 | 0.51 | 0.28 |
|  | 0.49 | 0.57 | 0.31 |
|  | 0.85 | 0.61 | 0.38 |
|  | 0.99 | 0.45 | 0.28 |
|  | 1.02 | 0.53 | 0.28 |
|  | 0.84 | 0.54 | 0.26 |
|  | 0.84 | 0.53 | 0.35 |
|  | 0.99 | 0.43 | 0.31 |
|  | 1.08 | 0.46 | 0.29 |
|  | 0.80 | 0.51 | 0.34 |
|  | 0.88 | 0.48 | 0.28 |
|  | 0.69 | 0.47 | 0.37 |
|  | 0.96 | 0.51 | 0.30 |
|  | 0.56 | 0.52 | 0.39 |
|  | 0.15 | 0.49 | 0.22 |
|  | 0.92 | 0.56 | 0.34 |
|  | 0.92 | 0.56 | 0.33 |
|  | 0.38 | 0.51 | 0.30 |
|  | 1.07 | 0.55 | 0.38 |
|  | 0.81 | 0.60 | 0.34 |
|  | 0.90 | 0.53 | 0.33 |
| Mean | 0.795 | 0.522 | 0.312 |
| StDev | 0.237 | 0.044 | 0.045 |
| Variance | 0.05640 | 0.00195 | 0.00201 |

FIG. 13

| df | 2-Tail Confidence Level | | | | | |
|---|---|---|---|---|---|---|
| | 80% | 90% | 95% | 98% | 99% | 99.99% |
| 1 | 3.078 | 6.314 | 12.706 | 31.821 | 64 | 637 |
| 2 | 1.886 | 2.92 | 4.303 | 6.965 | 10 | 31.598 |
| 3 | 1.638 | 2.353 | 3.182 | 4.541 | 5.841 | 12.929 |
| 4 | 1.533 | 2.132 | 2.776 | 3.747 | 4.604 | 8.61 |
| 5 | 1.476 | 2.015 | 2.571 | 3.365 | 4.032 | 6.869 |
| 6 | 1.44 | 1.943 | 2.447 | 3.143 | 3.707 | 5.959 |
| 7 | 1.415 | 1.895 | 2.365 | 2.998 | 3.499 | 5.408 |
| 8 | 1.397 | 1.86 | 2.306 | 2.896 | 3.355 | 5.041 |
| 9 | 1.383 | 1.833 | 2.263 | 2.821 | 3.25 | 4.781 |
| 10 | 1.372 | 1.812 | 2.228 | 2.764 | 3.169 | 4.587 |
| 11 | 1.363 | 1.796 | 2.201 | 2.718 | 3.106 | 4.437 |
| 12 | 1.356 | 1.782 | 2.179 | 2.681 | 3.055 | 4.318 |
| 13 | 1.35 | 1.771 | 2.16 | 2.65 | 3.012 | 4.221 |
| 14 | 1.345 | 1.761 | 2.145 | 2.624 | 2.977 | 4.14 |
| 15 | 1.341 | 1.753 | 2.131 | 2.602 | 2.947 | 4.073 |
| 16 | 1.337 | 1.746 | 2.12 | 2.583 | 2.921 | 4.015 |
| 17 | 1.333 | 1.74 | 2.11 | 2.567 | 2.898 | 3.965 |
| 18 | 1.33 | 1.734 | 2.101 | 2.552 | 2.878 | 3.922 |
| 19 | 1.328 | 1.729 | 2.093 | 2.539 | 2.861 | 3.883 |
| 20 | 1.325 | 1.725 | 2.086 | 2.528 | 2.845 | 3.85 |
| 21 | 1.323 | 1.721 | 2.08 | 2.518 | 2.831 | 3.819 |
| 22 | 1.321 | 1.717 | 2.074 | 2.508 | 2.819 | 3.792 |
| 23 | 1.319 | 1.714 | 2.069 | 2.5 | 2.807 | 3.767 |
| 24 | 1.318 | 1.711 | 2.064 | 2.492 | 2.797 | 3.745 |
| 25 | 1.316 | 1.708 | 2.06 | 2.485 | 2.787 | 3.725 |
| 26 | 1.315 | 1.706 | 2.056 | 2.479 | 2.779 | 3.707 |
| 27 | 1.314 | 1.703 | 2.052 | 2.473 | 2.771 | 3.69 |
| 28 | 1.313 | 1.701 | 2.048 | 2.467 | 2.763 | 3.674 |
| 29 | 1.311 | 1.699 | 2.045 | 2.462 | 2.756 | 3.649 |
| 30 | 1.31 | 1.697 | 2.042 | 2.457 | 2.75 | 3.656 |

Student's t Distribution Table

REFRIGERATOR APPLIANCE AND METHOD OF FORMING REFRIGERATOR APPLIANCE USING ULTRASONIC WELDING

FIELD OF THE INVENTION

This application relates generally to a refrigerator appliance and more specifically, a method of manufacturing the refrigerator appliance using ultrasonic welding.

BACKGROUND OF THE INVENTION

A refrigerator appliance typically includes a cabinet having an inner liner defining one or more compartments for storing food items, and an outer shell surrounding the inner liner that defines an exterior of the cabinet. Moreover, foam insulation is typically injected into a space between the inner liner and outer shell, and then cured. The foam will expand during the curing process such that once curing is complete, the liner will be held in place within the outer shell by the cured foam.

In some cases, refrigerator components (e.g., wall grommets, electrical boxes, air ducts, water conduits, wall anchors, etc.) are attached to an exterior surface of the inner liner with tapes or glues before foam is injected into the cabinet. For example, an air duct can be attached to the exterior surface of the liner with tape or glue such that the air duct is aligned with an aperture of the liner and an interior of the air duct communicates with an interior of the liner through the aperture. The foam will similarly hold these refrigerator components in place once injected and cured.

However, tapes and glues can be expensive and time consuming to apply, particularly if an interface between the refrigerator component and the liner has a complicated geometry. Moreover, the bond formed by tapes or glues can be rather weak, leading to other problems. For example, the refrigerator components can become displaced prior to or during injection and curing of the insulating foam. As another example, the foam during injection can leak through the taped or glued interface of a refrigerator component and the liner into an interior of the refrigerator component (e.g., air duct) and/or liner.

BRIEF SUMMARY OF THE INVENTION

The following presents a simplified summary of example embodiments of the invention. This summary is not intended to identify critical elements of the invention or to delineate the scope of the invention. The sole purpose of the summary is to present some example embodiments in simplified form as a prelude to the more detailed description that is presented later.

In accordance with one aspect, a method of improving a foam insulation process for a refrigerator appliance includes a providing step of providing a thermoformed liner and an injection-molded or extruded refrigerator component for attachment to the liner. The liner defines a compartment for storing food items and includes a liner contact structure. The refrigerator component includes component contact structure. The method further includes a staging step that includes arranging the liner and refrigerator component such that the liner contact structure and component contact structure are in direct contact with each other under pressure, wherein the liner and refrigerator component as arranged form a staged assembly. Moreover, the method includes a welding step that includes applying ultrasonic energy to the staged assembly to weld the liner and refrigerator component together at an interface of the component contact structure and liner contact structure, wherein the liner and refrigerator component as welded together form a liner assembly. The method further includes a cabinet assembly step that includes arranging the liner assembly within an outer shell, and then injecting an insulating foam into a space between the liner assembly and outer shell.

In accordance with a second aspect, a method of manufacturing a refrigerator appliance includes a providing step of providing a liner and a refrigerator component for attachment to the liner. The liner defines a compartment for storing food items and includes a liner contact structure. The refrigerator component includes component contact structure. The method further includes a staging step that includes arranging the liner and refrigerator component such that the liner contact structure and component contact structure are in direct contact with each other under pressure, wherein the liner and refrigerator component as arranged form a staged assembly. Moreover, the method includes a welding step that includes applying ultrasonic energy to the staged assembly to weld the liner and refrigerator component together at an interface of the component contact structure and liner contact structure, wherein the liner and refrigerator component as welded together form a liner assembly.

In accordance with a third aspect, a refrigerator appliance includes a liner assembly having a liner defining a compartment for storing food items, and a refrigerator component welded to the liner via ultrasonic welding. The refrigerator appliance further includes an outer shell that surrounds the liner assembly, and foam insulation provided between the liner assembly and outer shell.

In accordance with a fourth aspect, a liner assembly suitable for a refrigerator appliance includes a liner defining a compartment for storing food items, and a refrigerator component welded to the liner via ultrasonic welding.

It is to be understood that both the foregoing general description and the following detailed description present example and explanatory embodiments. The accompanying drawings are included to provide a further understanding of the described embodiments and are incorporated into and constitute a part of this specification. The drawings illustrate various example embodiments.

BRIEF DESCRIPTION OF THE DRAWINGS

The foregoing and other aspects of the present invention will become apparent to those skilled in the art to which the present invention relates upon reading the following description with reference to the accompanying drawings, in which.

DETAILED DESCRIPTION

Example embodiments are described and illustrated in the drawings. These illustrated examples are not intended to be a limitation on the present invention. For example, one or more aspects can be utilized in other embodiments and even other types of method and devices. Moreover, certain terminology is used herein for convenience only and is not to be taken as a limitation. Still further, in the drawings, the same reference numerals are employed for designating the same elements or steps.

Figure 1:
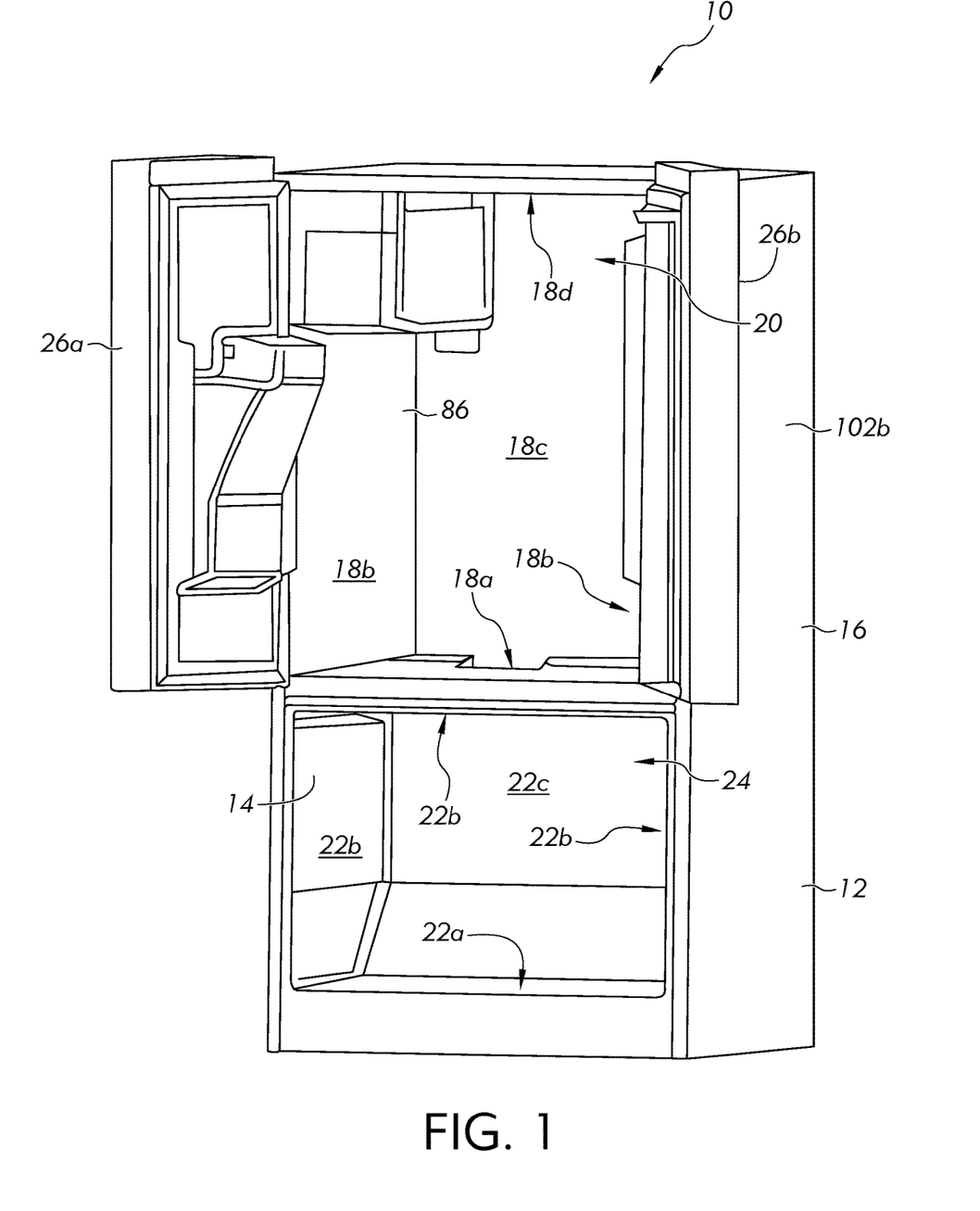
FIG. 1 is a front-perspective view of an example refrigerator appliance.

With reference to FIG. 1, an example refrigerator appliance 10 is illustrated that includes a cabinet 12 comprising a liner 14 and an outer shell 16 that surrounds the liner 14. The liner 14 can include one or more walls that define one or more compartments for storing food items. For instance, the liner 14 in the illustrated embodiment includes a first set of walls 18 including a bottom wall 18a, a pair of side walls 18b, a rear wall 18c, and a top wall 18d that collectively define a first compartment 20. The liner 14 also includes a second set of walls 22 including a bottom wall 22a, a pair of side walls 22b, a rear wall 22c, and a top wall 22d that collectively define a second compartment 24 arranged below the first compartment 20. The first compartment 20 corresponds to a fresh-food compartment that can be maintained at temperature(s) between 0° C. and 4.5° C., while the second compartment 24 corresponds to a freezer compartment that can be maintained at temperature(s) below 0° C.

The appliance 10 can further include one or more doors 26 for providing selective access to its compartment(s). For example, the appliance 10 in the illustrated embodiment has a pair of French-doors 26a, 26b coupled to its cabinet 12 for providing selective access to the first compartment 20. The appliance 10 can further include a third door (not shown) for its second compartment 24 that is attached to a slidable drawer. However, it is to be appreciated that the appliance 10 can include any number, type, and arrangement of compartments and doors without departing from the scope of this disclosure.

Figure 2:
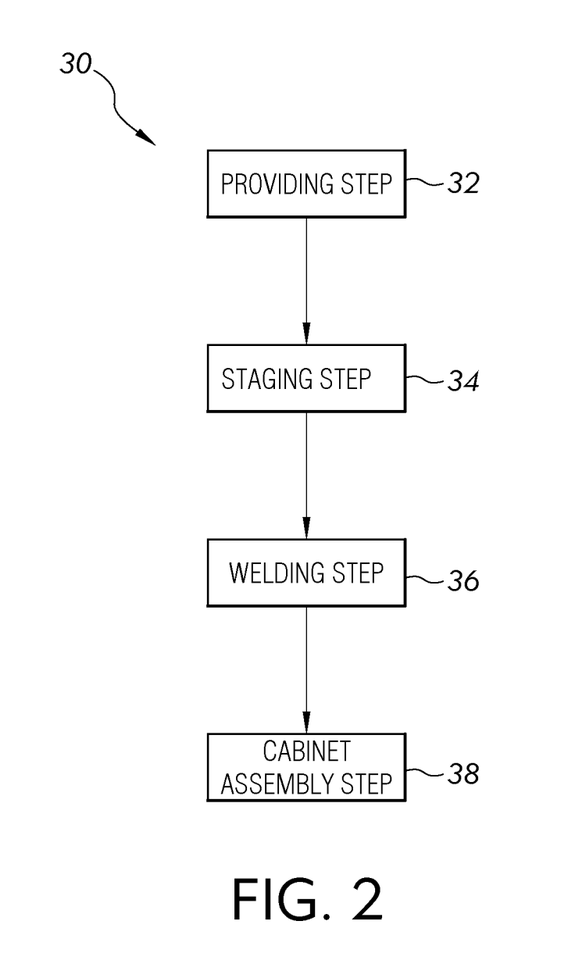
FIG. 2 is a flowchart showing an example method for manufacturing the refrigerator appliance in FIG. 1.
Figure 3:
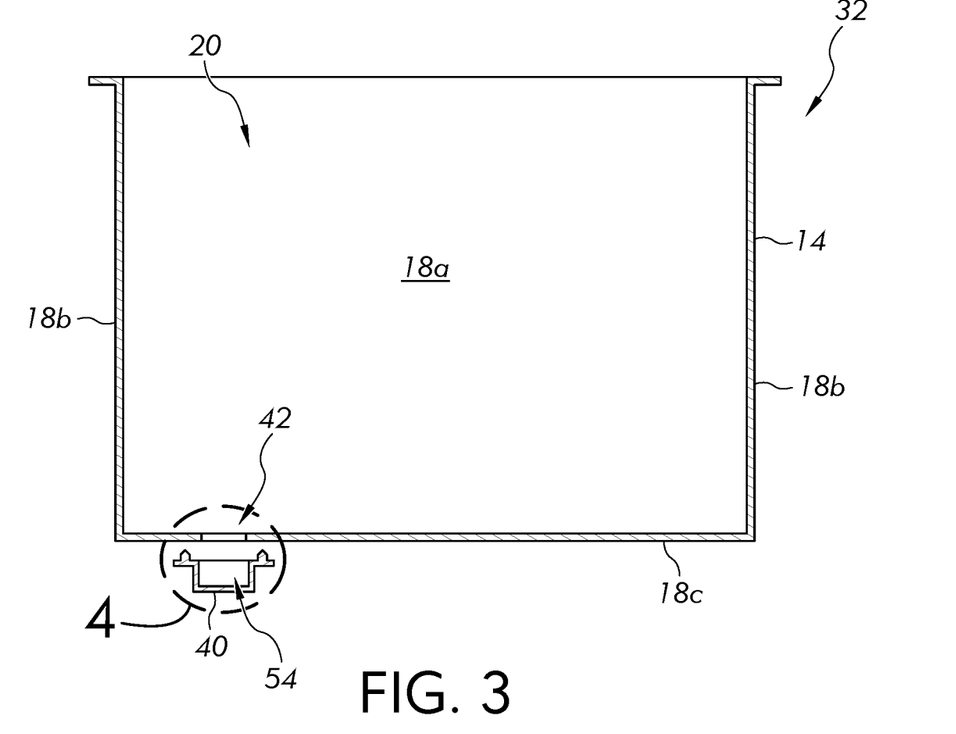
FIG. 3 is a schematic cross-section view of a liner and refrigerator component of the appliance provided during a providing step of the method.
Figure 4:
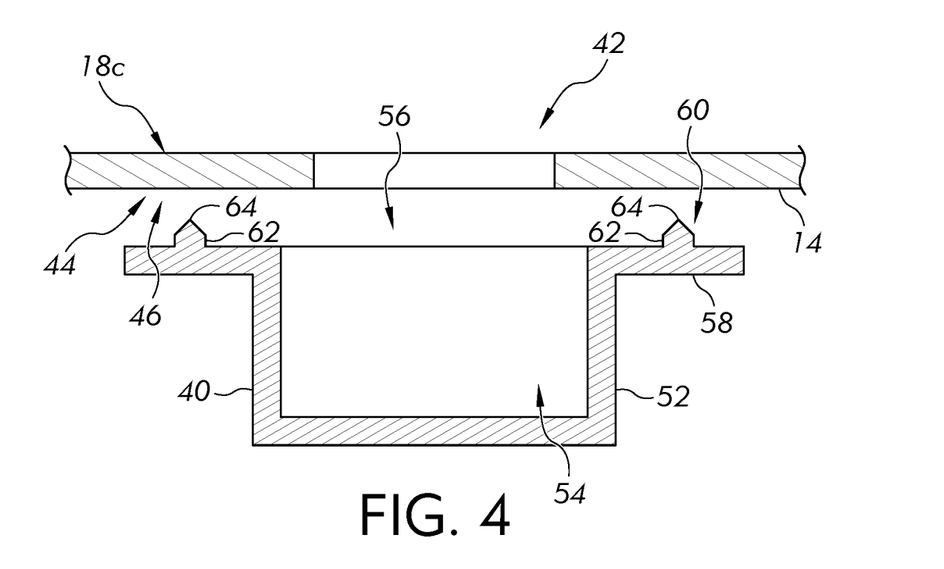
FIG. 4 is an enlarged detail cross-section view of the liner and refrigerator component in FIG. 3.
Figure 5:
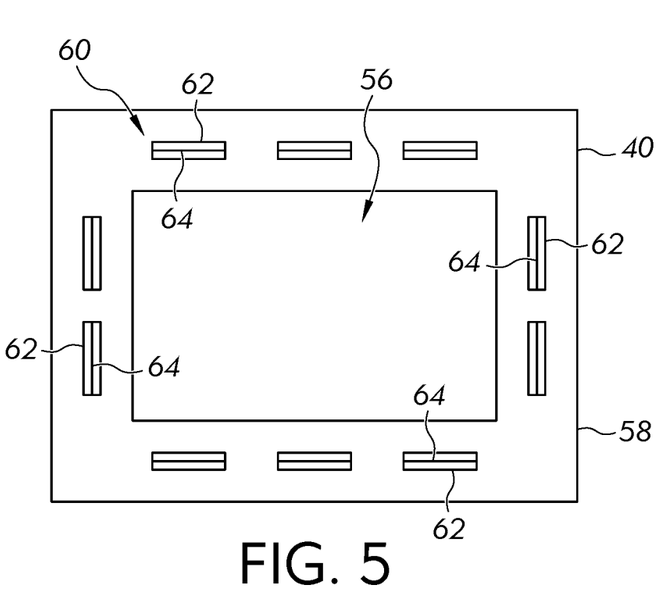
FIG. 5 is a front view of the refrigerator component.
Figure 6:
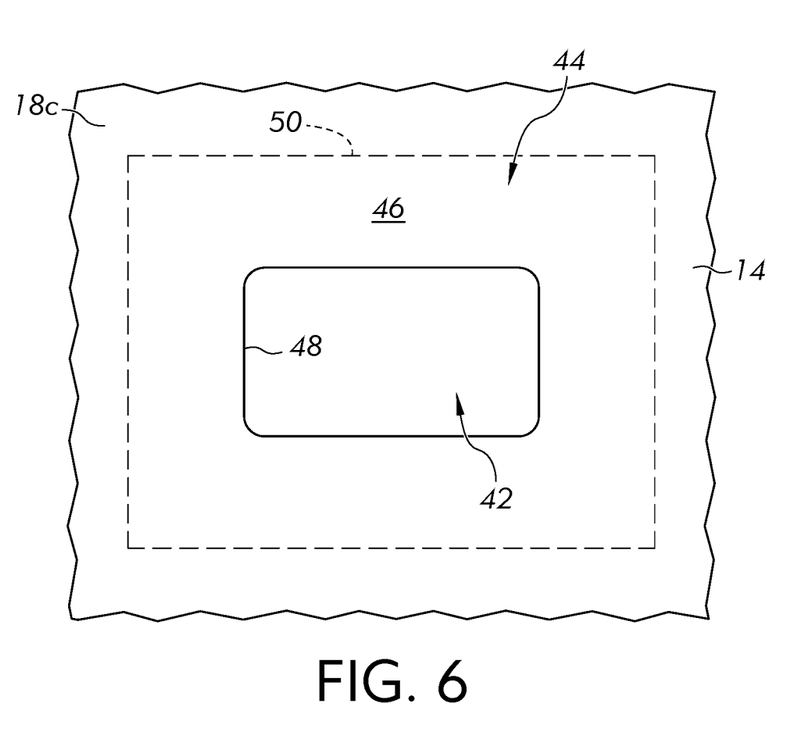
FIG. 6 is a rear enlarged detail view of the liner.

Foam insulation can be injected into space(s) between the liner 14 and outer shell 16 of the appliance 10 to improve insulation of the liner's compartment(s). With reference to FIGS. 2-12, an example method 30 for manufacturing the appliance 10 in FIG. 1 and improving its foam insulation process will now be described. As shown in FIG. 2, the method 30 includes a providing step 32, a staging step 34, a welding step 36, and a cabinet assembly step 38, which are described below in further detail.

Turning to FIGS. 3-6, the providing step 32 can include providing the liner 14 of the appliance 10 and a refrigerator component 40 for attachment to the liner 14. The liner 14 can define one or more apertures that extend through its wall(s) and can enable service utilities to pass through the liner 14 and into its compartment(s), such as electrical cables, liquid tubes, refrigerant tubes, etc. For instance, the liner 14 in the illustrated embodiment includes a single aperture 42 that is substantially rectangular in shape (see FIG. 6) and extends through its rear wall 18c. However, this aperture 42 may have other shapes and/or be located in other walls of the liner 14 in some examples. Moreover, the liner 14 may include additional apertures in some examples.

The liner 14 can further include liner contact structure 44 that, as discussed further below, can be placed in direct contact with corresponding structure of the refrigerator component 40 when attaching the liner 14 and refrigerator component 40 together. In the present embodiment, the liner contact structure 44 comprises a flat, continuous surface 46 on a rear side of the rear wall 18c that circumscribes the aperture 42 (see FIG. 6). In particular, the surface 46 is an annular surface having an inner perimeter 48 that corresponds to a perimeter of the aperture 42, and an outer perimeter 50 that is spaced outwardly from the inner perimeter 48. However, the surface 46 may be curved, angled, and/or stepped in some examples, and may extend only partially about the aperture 42. Indeed, the liner contact structure 44 can comprise any configuration of structure (e.g., surface, edge, projection, recess, ribs, etc.) that can be placed in direct contact with corresponding structure of the refrigerator component 40 when attaching the liner 14 and refrigerator component 40 together.

The refrigerator component 40 can correspond to a variety of different components for attachment to the liner 14 such as, for example, a wall grommet, an electrical box, an air duct, a water conduit, a refrigerant conduit, or a wall anchor. The refrigerator component 40 in the illustrated example is an electrical box comprising a main body 52 (see FIG. 4) that defines an interior space 54 and an opening 56 for providing access to the interior space 54. The main body 52 can further define one or more apertures (not shown) that can permit wiring to fed into the interior space 54. Moreover, the refrigerator component 40 further includes a flange 58 attached to the main body 52 that extends about the entire perimeter of the opening 56. Preferably, the refrigerator component 40 is a unitary or monolithic body to thereby limit the potential for foam leakage after installation upon the liner 14. However, the refrigerator component 40 can comprise a variety of different configurations without departing from the scope of the disclosure.

The refrigerator component 40 can include a component contact structure 60 that can be placed in direct contact with the liner contact structure 44 of the liner 14 when attaching the liner 14 and refrigerator component 40 together. In the present embodiment, the component contact structure 60 is defined by the flange 58 of the refrigerator component 40, and comprises a plurality of ribs 62 that are spaced about the perimeter of the opening 56 (see FIGS. 4 & 5) and stand proud of the flange 58 surface. Each rib 62 defines a contact edge 64 that, as discussed further below, can be arranged in direct contact with the contact structure 44 (e.g., surface 46) of the liner 14 when attaching the liner 14 and refrigerator component 40 together. However, the ribs 62 can be arranged differently or have different shapes in other examples. Moreover, the component contact structure 60 in some examples can comprise a contact surface in addition or in alternative to the ribs 62, which can be arranged in direct contact and flush with the contact surface 46 of the liner 14 when attaching the liner 14 and refrigerator component 40. Indeed, the component contact structure 60 can comprise any configuration of structure (e.g., surface, edge, projection, recess, ribs, etc.) that can be placed in direct contact with the contact structure 44 of the liner 14 when attaching the liner 14 and refrigerator component 40 together.

The liner 14 and refrigerator component 40 preferably comprise the same type of material and more preferably, the same type of plastic (i.e., polyethylene terephthalate, high-density polyethylene, polyvinyl chloride, low-density polyethylene, polypropylene, or polystyrene). For instance, the liner 14 and refrigerator component 40 in the illustrated embodiment both consist of polystyrene and more specifically, high-impact polystyrene. Whichever material is used for the liner 14 and refrigerator component 40, the grades of material used for the two can be different from each other, with different specific gravities and melt flows. Moreover, the material of the liner 14 and material of the refrigerator component 40 preferably have a difference in melt temperature of 25° C. or less and more preferably, 22° C. or less. In one example, although the same type of plastic, one of the components can be made of an injection molding grade plastic while the other component can be made of a thermoforming, roto-molding, or blow-molding grade plastic.

The liner 14 and refrigerator component 40 provided in the providing step 32 can be formed in advance using a variety of different processes. For example, the liner 14 can be formed via thermoforming by heating a plastic sheet and then shaping the heated sheet in a mold. Such thermoforming can be a relatively low-cost method of forming the liner 14. Meanwhile, the refrigerator component 40 can be formed via injection molding, which can be a more expensive but enables more complex shapes to be formed for the refrigerator component 40. In other examples, the refrigerator component 40 may be formed by an extrusion process. The liner 14 and refrigerator component 40 can be formed by a variety of different processes without departing from the scope of the disclosure. Moreover, in some examples, the providing step 32 can actually include a step of forming the liner 14 and/or refrigerator component 40 using the processes described above.

Figure 7:
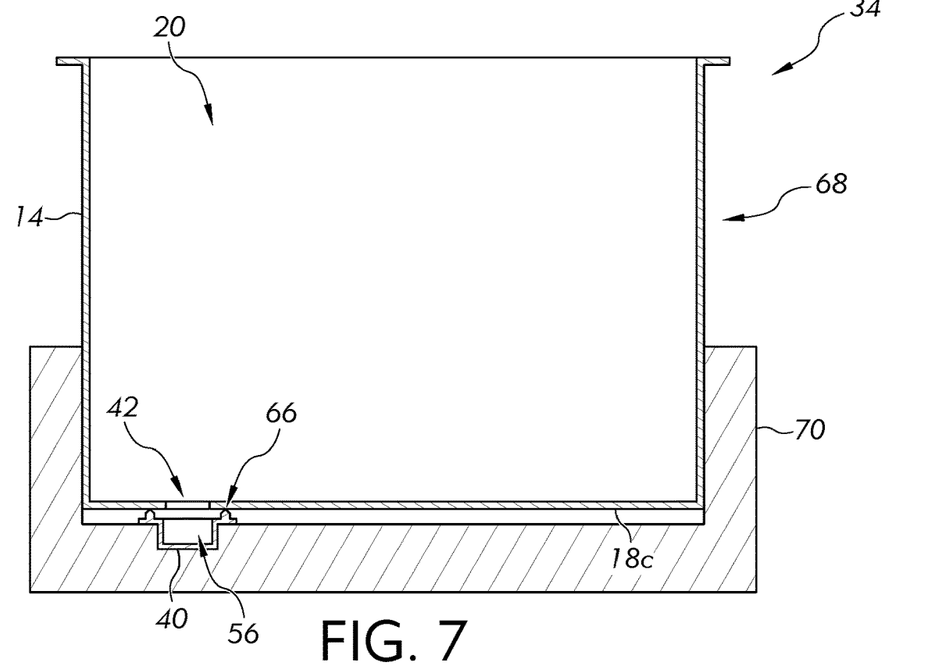
FIG. 7 is a schematic cross-section view of the liner and refrigerator component being staged during a staging step of the method.
Figure 8:
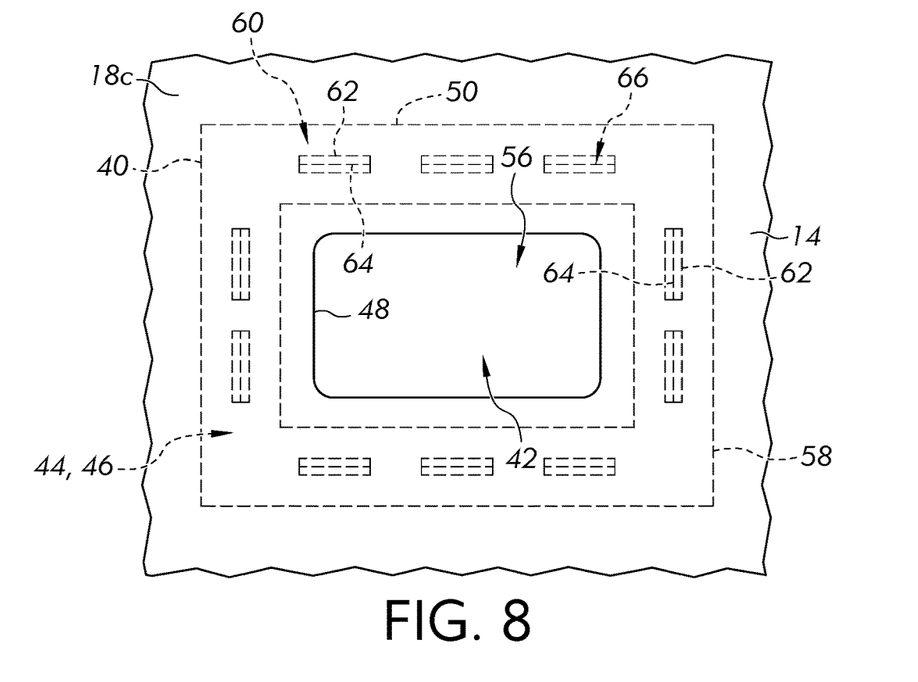
FIG. 8 is an enlarged detail front view of the liner and refrigerator component in FIG. 7.

Turning to FIGS. 7 & 8, the staging step 34 can include arranging the liner 14 and refrigerator component 40 such that the liner contact structure 44 and component contact structure 60 are in direct contact with each other under pressure, thereby defining an interface 66 between the liner 14 and refrigerator component 40 (for the purposes of this disclosure, an "interface" between components refers to the area(s) at which the two components directly contact each other and/or are welded together). The liner 14 and refrigerator component 40 as arranged will collectively form a staged assembly 68, which can be further processed in later steps.

In the illustrated embodiment, the liner 14 and refrigerator component 40 are arranged such that the ribs 62 of the refrigerator component 40 directly contact the surface 46 of the liner 14 at their edges 64, and form the only points of contact between the liner 14 and refrigerator component 40. Moreover, the liner 14 and refrigerator component 40 are arranged such that their interface 66 circumscribes the aperture 42 of the liner 14 and is broken up by the spacing between adjacent ribs 62. However, the interface 66 in other examples can be continuous about the perimeter of the aperture 42.

The liner 14 and refrigerator component 40 can be arranged during the staging step 34 by nesting the liner 14 and refrigerator component 40 within a rigid fixture 70 (see FIG. 7), which will support the liner 14 and refrigerator component 40 in their arranged positions and limit relative movement among the parts. However, the liner 14 and refrigerator component 40 can be arranged together using other means including, for example, manual force and/or clamps.

Figure 9:
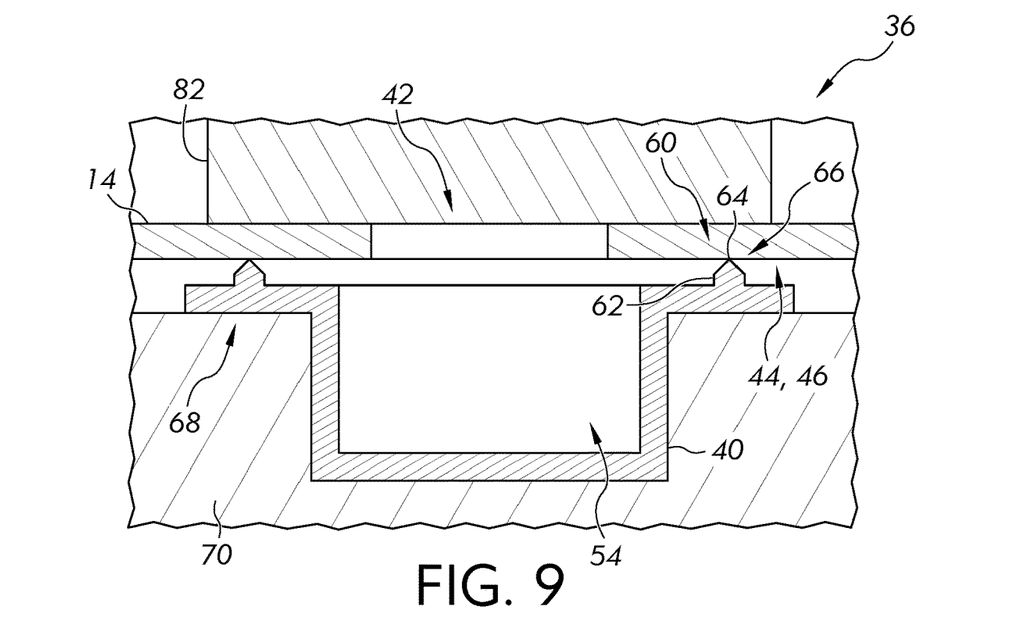
FIG. 9 is an enlarged, detail schematic cross-section view of the liner and refrigerator component being welded during a welding step of the method.
Figure 10:
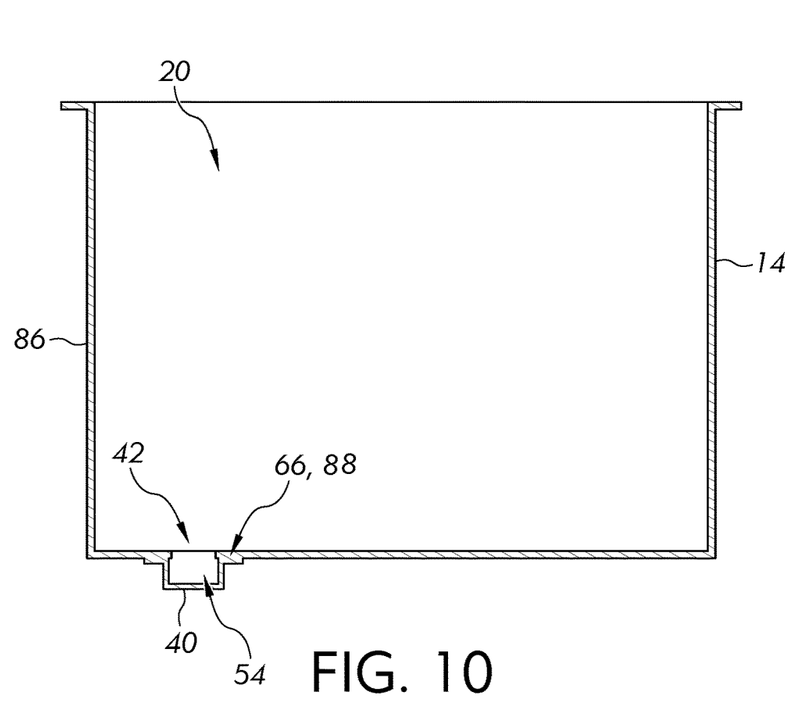
FIG. 10 is a schematic cross-section view of the liner and refrigerator component welded together to form a liner assembly.
Figure 11:
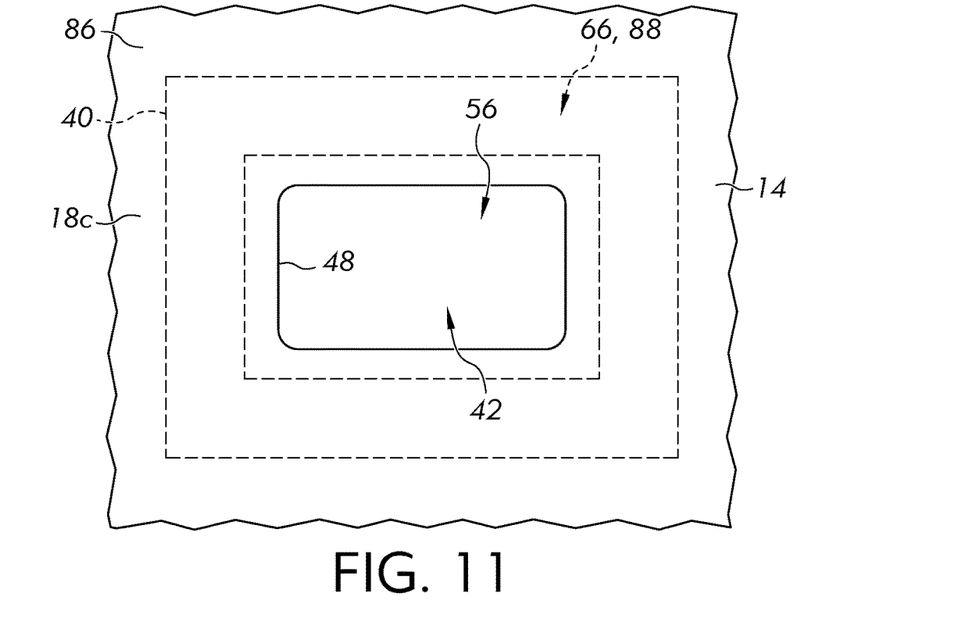
FIG. 11 is an enlarged detail front view of the liner assembly.

As shown in FIG. 9, the welding step 36 comprises applying ultrasonic energy to the staged assembly 68 while the interface 66 of the liner 14 and refrigerator component 40 is under pressure (e.g., 10-20 p.s.i., such as about 15 p.s.i.) to thereby ultrasonically weld the liner 14 and refrigerator component 40 together at the interface 66. In particular, a sonotrode 82 can be used to apply ultrasonic energy to the staged assembly 68 at a predetermined frequency and amplitude (e.g., 20-40 kHz, such as 35 kHz at about 0.0002-0.0020 in.), which will generate vibrations at the pressured interface 66 of the liner 14 and refrigerator component 40. For embodiments in which the liner 14 and refrigerator component 40 comprise plastic, these vibrations will generate friction that causes the liner 14 and refrigerator component 40 to melt at their points of contact and weld together. With metals, however, welding will occur due to high-pressure dispersion of surface oxides and local motion of the materials.

In the illustrated embodiment, the sonotrode 82 is arranged to press directly against the liner 14 and apply ultrasonic energy directly to the liner 14. Such pressure of the sonotrode 82 against the liner 14 will generate corresponding pressure at the interface 66 of the liner 14 and refrigerator component 40 to facilitate the welding process. However, the sonotrode 82 may be arranged to press directly against the refrigerator component 40 in other examples. Moreover, the sonotrode 82 may be arranged to apply ultrasonic energy and pressure indirectly to the liner 14 and/or refrigerator component 40 in some examples.

Preferably, the liner 14 and/or refrigerator component 40 are configured to concentrate the ultrasonic energy supplied by the sonotrode 82 at their interface 66. For example, as discussed above, the refrigerator component 40 in the illustrated embodiment comprises a plurality of ribs 62 defining edges 64 that can be arranged in direct contact with the surface 46 of the liner 14 to form the staged assembly 68. These edges 64 will preferably be the only points of contact between the liner 14 and refrigerator component 40. By contacting the surface 46 of the liner 14 only with the edges 64 of the ribs 62, this will limit the initial contact area (i.e., interface 66) between the liner 14 and refrigerator component 40, thereby concentrating the ultrasonic energy supplied by the sonotrode 82 to a relatively small area. Such concentration of the ultrasonic energy will quickly heat the liner 14 and refrigerator component 40 at their interface 66 and facilitate initiation of the weld.

Once welded together, the liner 14 and refrigerator component 40 will form a unitary, integrated liner assembly 86 (see FIGS. 10 & 11) having a hermetic seal 88 at the interface 66 of the liner 14 and refrigerator component 40. In the illustrated embodiment, the hermetic seal 88 is continuous and extends about the entire perimeter of the liner aperture 42. However, the hermetic seal 88 may extend partially about the aperture 42 and/or be discontinuous in other examples.

Figure 12:
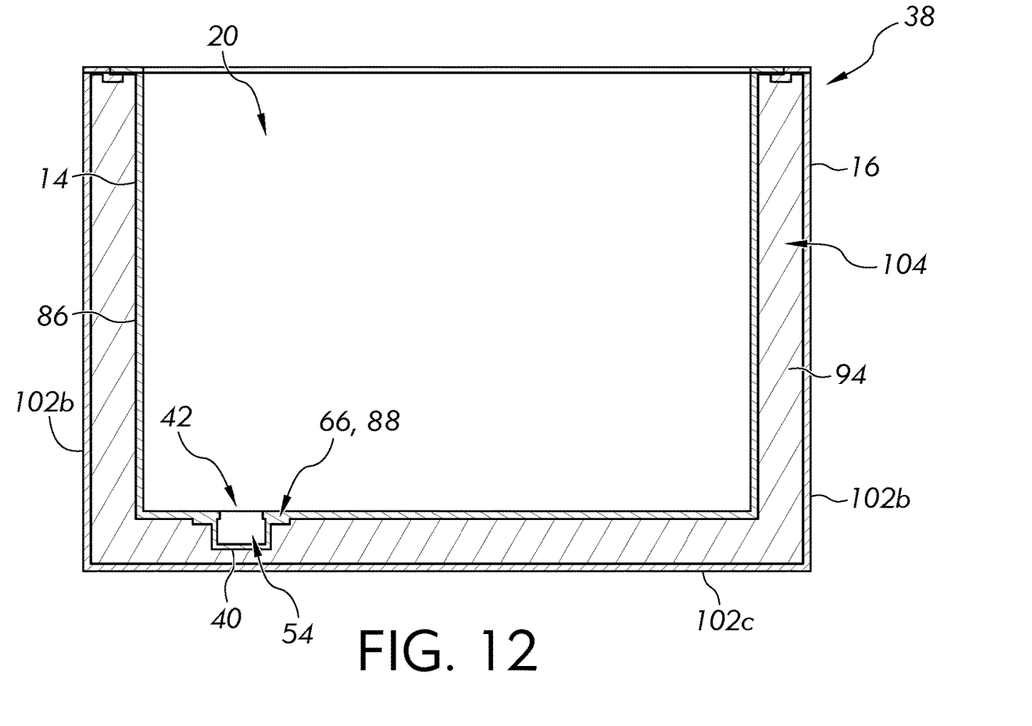
FIG. 12 is a schematic cross-section view of a cabinet assembly step of the method.

As shown in FIG. 12, the cabinet assembly step 38 can include arranging the liner assembly 86 within the outer shell 16 and then injecting an expanding, insulating foam 94 into the space between the liner assembly 86 and the outer shell 16. In the illustrated embodiment, the outer shell 16 comprises a piece of sheet metal that is bent to form a pair of side walls 102b and a rear wall 102c that collectively form a space 104 for receiving the liner assembly 86. The sheet metal can be bent to form additional and/or alternative walls (e.g., a top wall) in some examples. Moreover, in some examples, the outer shell 16 can comprise multiple walls that are separately attached to each other to form the outer shell 16. For instance, in some examples a piece of sheet metal can be bent to form side walls and a top wall, while a separate bottom wall and rear wall are separately attached to the bent sheet metal to form the outer shell 16. The outer shell 16 can comprise any configuration of walls forming a space for receiving the liner assembly 86.

While the liner assembly 86 is arranged within the space 104, the foam 94 can be injected into the portions of the space 104 between the liner assembly 86 and outer shell 16, and then cured. The foam 94 will expand during the curing process such that once curing is complete, the liner assembly 86 will be held in place within the outer shell 16 by the cured foam 94.

By attaching the refrigerator component 40 to the liner 14 via ultrasonic welding as described above, various advantages can be realized over prior art methods of attaching a refrigerator component to a liner with tapes or glues. For example, the material costs and labor costs of applying tape or glue to their interface 66 can be eliminated. Although ultrasonic welding will incur its own special costs for welding equipment and labor, such costs can be mitigated and scaled through automation and mass production, whereas automation is more difficult to implement when dealing with tapes or glues.

Moreover, the bond strength between the refrigerator component 40 and liner 14 is increased, thereby preventing displacement of the refrigerator component 40 during injection and curing of the foam 94. Still further, the hermetic seal 88 between the refrigerator component 40 and liner 14 can prevent the injected foam from leaking into the interior spaces of the liner 14 and refrigerator component 40. In contrast, in embodiments wherein the refrigerator component 40 and liner 14 are attached to each other with glues or tapes, the bond strength is weaker and injected foam can leak through the interface of the refrigerator component 40 and liner 14.

For example, as discussed below, various tests were performed to compare the bonding strength of samples bonded together with ultrasonic welding versus the bonding strength of samples bonded together with traditional methods using glue or tape, which confirmed that the samples bonded together via ultrasonic welding had a significantly higher bonding strength.

More specifically, a group of 25 welded samples was produced in which for each sample, two flat substrates comprising thermoformed high-impact polystyrene were welded together using a Hermann Ulstrasonics™ HSG Digital 1000 hand welder. The welder applied ultrasonic energy at an amplitude of 0.00098 and a frequency of 35 kHz while the two substrates were held together under a pressure of 15 p.s.i. The final welded interface between the two substrates was approximately 1 sq. inch in area.

Meanwhile, a group of 25 taped samples was produced in which for each sample, two flat substrates comprising thermoformed high-impact polystyrene using double-sided tape (i.e., Duraco® Dubl Kote® acrylic white tape). The interface between the tape and each substrate was approximately 1 sq. inch in area.

Lastly, a group of 25 glued samples was produced in which for each sample, two flat substrates comprising thermoformed high-impact polystyrene were glued together with adhesive (i.e., Reynco 54-337 SM adhesive manufactured by The Reynolds Company™). The interface between the adhesive and each substrate was approximately 1 sq. inch in area.

Figure 13:
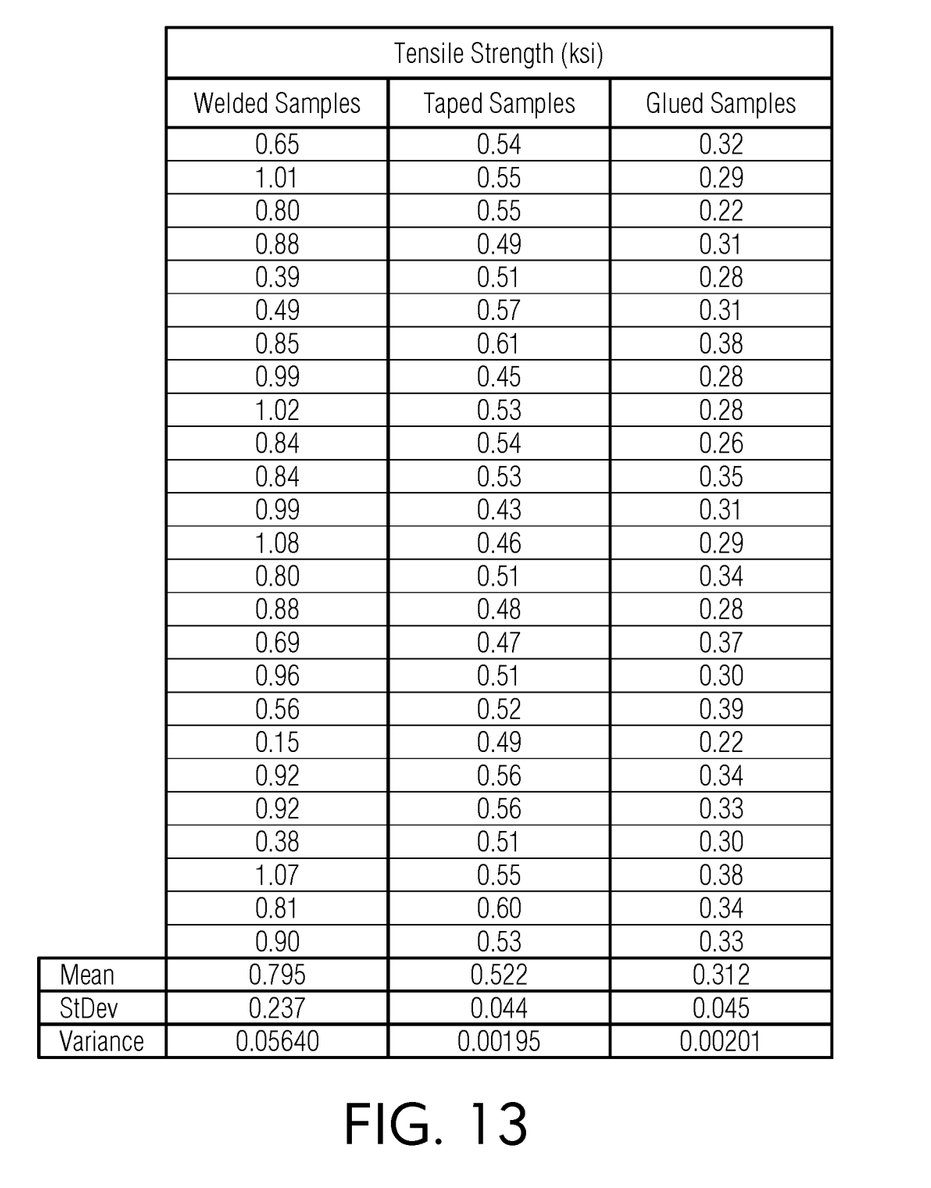
FIG. 13 shows a table listing tensile strengths observed for groups of samples bonded together by ultrasonic welding, glue, or tape, as well as the mean, standard deviation, and variance of tensile strength for each group.

The tensile strength of the bond for each sample above was then tested using an Instron® Model 3367 Table Mounted Materials Testing System, Capacity 30 kN. FIG. 13 shows a table listing the tensile strengths observed for each sample, as well as the mean, standard deviation, and variance of tensile strength for each group.

From here, a statistical analysis of the results in FIG. 13 was performed using a two-sample, two-tailed t-test to determine if there was a statistically significant difference in tensile strength between the group of welded samples and the groups of glued and taped samples. That is, for each comparison of groups (i.e., welded group versus glued group and welded group versus taped group), a t value was calculated as follows:

$$t = \frac{X_1 - X_2}{\sqrt{\frac{S_1^2}{n_1} - \frac{S_2^2}{n_2}}}$$

wherein $X_1$ and $X_2$ are the mean tensile strengths of the respective groups, $S_1^2$ and $S_2^2$ are the variances in tensile strength for the respective groups, and $n_1$ and $n_2$ are sample sizes for the respective groups.

Figure 14:
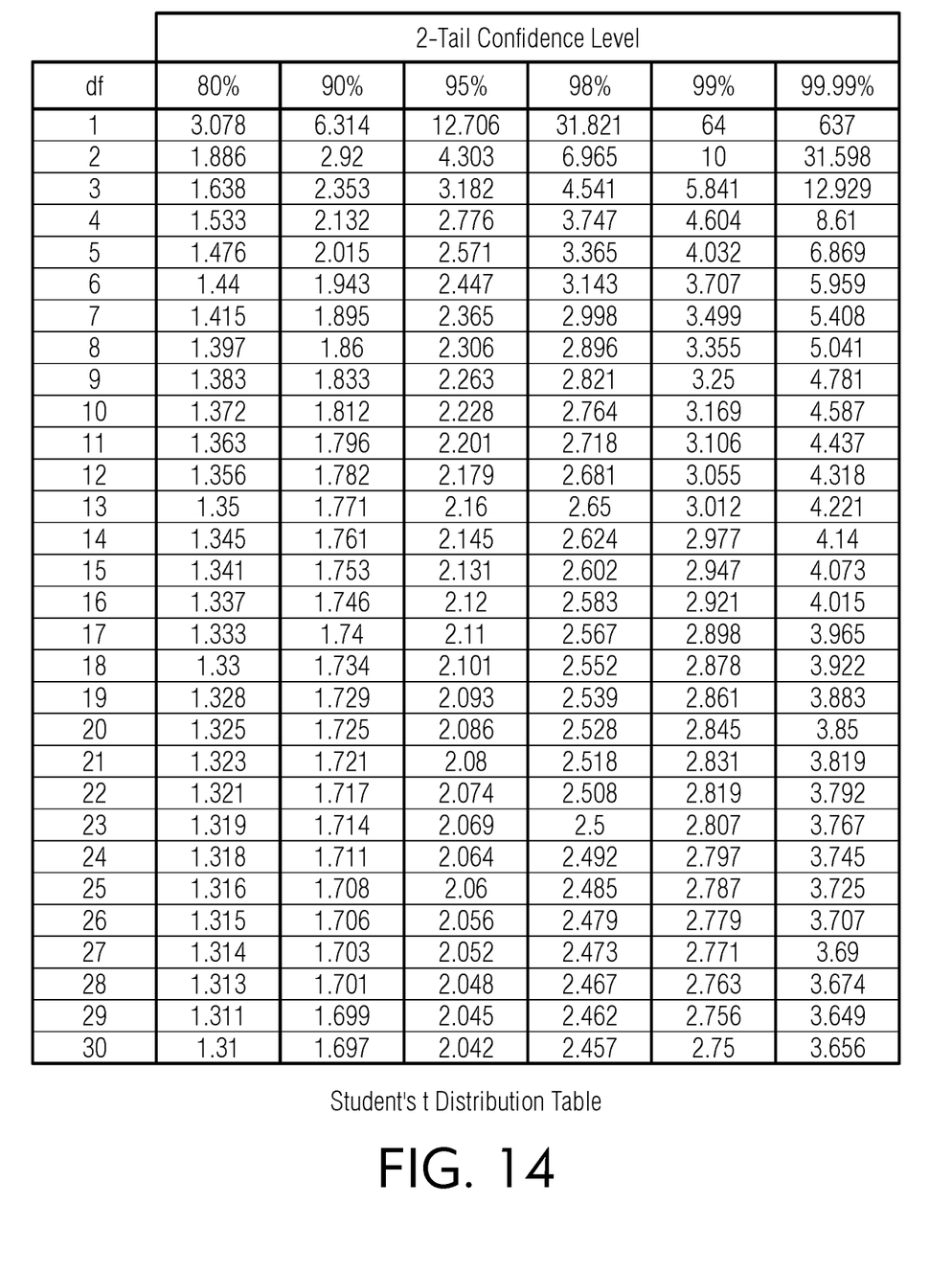
FIG. 14 shows a Student's t Distribution Table.

The calculated t value for the welded group versus taped group was 5.65, while the calculated t value for the welded group versus glued group was 9.99. These calculated t values were then compared against a critical t value of 2.064 provided in the Student's t Distribution Table shown in FIG. 14 for a 2-Tail Confidence Level of 95% with 24 degrees of freedom df (the degrees of freedom df being equal to sample size n minus 1). Because the calculated t values of 5.65 and 9.99 were both higher than the critical t value of 2.064, this means that there was a statistically significant difference in tensile strength between the group of welded samples and the groups of glued and taped samples, with a 95% confidence level. Indeed, the calculated t values of 5.65 and 9.99 were also higher than the critical t value of 3.745 provided in the Student's t Distribution Table for a 2-Tail Confidence Level of 99.9% with 24 degrees of freedom df, meaning that there was a statistically significant difference in tensile strength between the groups with a 99.9% confidence level.

Separately, a p-value was also calculated for each comparison of groups using Excel. The calculated p-value for the welded group versus taped group was $8.65 \times 10^{-7}$, while the calculated p-value for the welded group versus glued group was $1.18 \times 10^{-10}$. Thus, both calculated p-values were significantly smaller than a critical p-value of 0.05, further confirming that there was a statistically significant difference in tensile strength between the group of welded samples and the groups of glued and taped samples.

Thus, it can be confidently stated that the ultrasonic welding method described above improves the bond strength between the refrigerator component 40 and liner 14 compared to traditional methods using tapes or adhesive.

Figure 15:
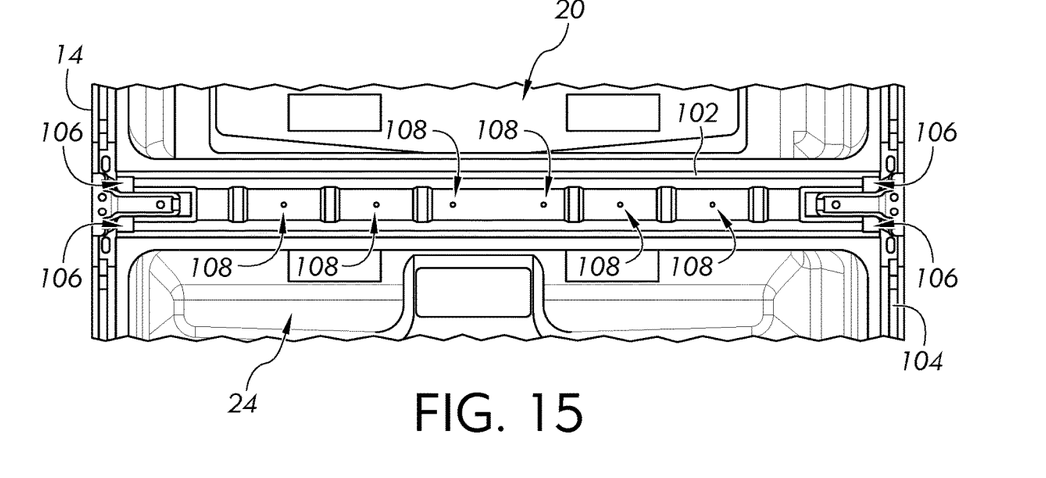
FIG. 15 is an enlarged-front view of the liner of the appliance.
Figure 16:
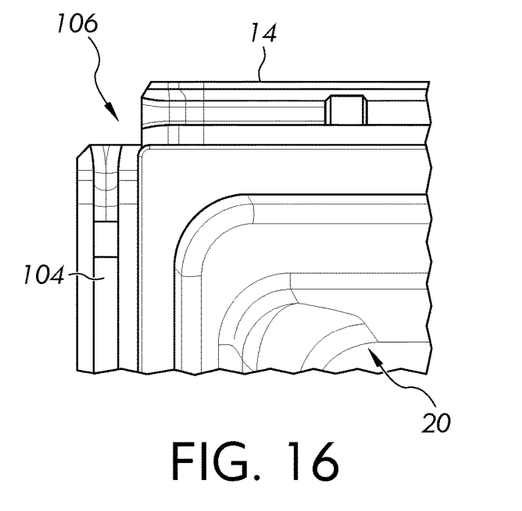
FIG. 16 is another enlarged-front view of the liner.
Figure 17:
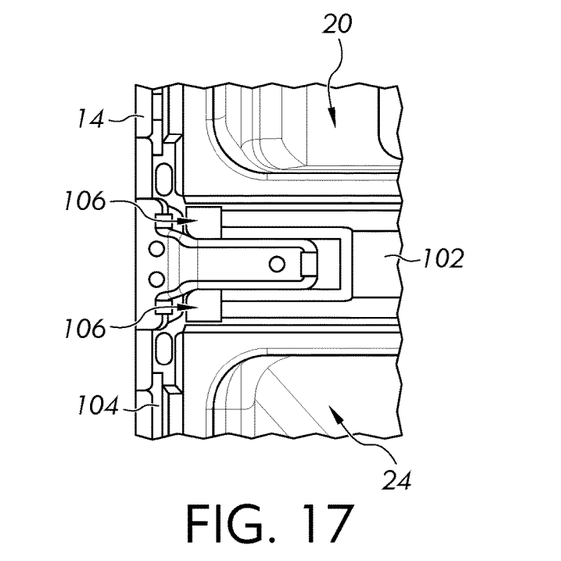
FIG. 17 is yet another enlarged-front view of the liner.

Turning to FIGS. 15-17, another aspect of the appliance 10 above will now be described. As discussed above, the liner 14 of the appliance 10 can define a first (upper) compartment 20 and a second (lower) compartment 24, and the appliance 10 can be manufactured by arranging the liner 14 within the outer shell 16 and then injecting insulating foam 94 into spaces between the liner 14 and outer shell 16. As shown in FIGS. 15-17, the liner 14 in some examples can include a mullion portion 102 between the two compartments 20, 24, and a front flange 104 that circumscribes the upper and lower compartments 20, 24. Various cutouts (e.g., holes, openings, etc.) 106 can be formed at the corners of the flange 104 and near the ends of the mullion portion 102. Additionally, a plurality of apertures 108 can be provided along the mullion portion 102.

Before the insulating foam 94 is injected into spaces between the liner 14 and outer shell 16, one or more cover panels (not shown) can be arranged along and in front of the mullion portion 102 and flange 104 of the liner 14 to cover the mullion portion 102 and flange 104 (and their associated cutouts 106 and apertures 108). A hot melt adhesive (e.g., Kizen® FORCE adhesive) can then be injected in a melted state with pressure from a rear side of the flange 104 through its cutouts 106, thereby permeating into corresponding spaces located in front of the cutouts 106 that are surrounded and defined by the flange 104, outer shell 16, and cover panel(s). The adhesive once cooled will harden and glue the flange 104 to the outer shell 16 and cover panel(s) at these locations, thereby adding structural rigidity to the appliance 10. Moreover, the adhesive will provide a seal that obstructs air from entering the appliance 10 at these joints of the liner 14, outer shell 16, and cover panel(s).

Once the adhesive is cooled the insulating foam 94 can be injected into spaces behind the mullion portion 102 and flange 104 of the liner 14. The apertures 108 of the mullion portion 102 will permit the injected to foam to permeate through the apertures 108 into the space between the mullion portion 102 and cover panel(s). This will help reduce sweating on the cover panel(s) mounted in front of the mullion portion 102.

This application has been described with reference to the example embodiments described above. Modifications and alterations will occur to others upon a reading and understanding of this specification. Examples embodiments incorporating one or more aspects of the invention are intended to include all such modifications and alterations insofar as they come within the scope of the appended claims.

What is claimed is:

1. A method of improving a foam insulation process for a refrigerator appliance, comprising:
    a providing step of providing:
        a thermoformed liner that defines a compartment for storing food items and an aperture extending through the liner, the liner including liner contact structure, and
        an injection-molded or extruded refrigerator component for attachment to the liner, the refrigerator component including component contact structure,
        wherein the liner and refrigerator component comprise the same type of plastic, the type being one of polyethylene terephthalate, high-density polyethylene, polyvinyl chloride, low-density Polyethylene, polypropylene, and polystyrene;
    a staging step that includes arranging the liner and refrigerator component such that the liner contact structure and component contact structure are in direct contact with each other under pressure and an interface of the component contact structure and liner contact structure circumscribes the aperture, wherein the liner and refrigerator component as arranged form a staged assembly; and
    a welding step that includes applying ultrasonic energy to the staged assembly to weld the liner and refrigerator component together at the interface of the component contact structure and liner contact structure, wherein the liner and refrigerator component as welded together form a liner assembly; and
    a cabinet assembly step that includes arranging the liner assembly within an outer shell, and then injecting an insulating foam into a space between the liner assembly and outer shell,
    wherein a hermetic seal is formed at the interface of the liner and refrigerator component by the welding step, wherein the hermetic seal is continuous and extends about an entire perimeter of the aperture.

2. A method of manufacturing a refrigerator appliance, comprising:
    a providing step of providing:
        a liner that defines a compartment for storing food items and an aperture extending through the liner, the liner including liner contact structure, and
        a refrigerator component for attachment to the liner, the refrigerator component including component contact structure,
        wherein the liner and refrigerator component comprise the same type of plastic, the type being one of polyethylene terephthalate, high-density polyethylene, polyvinyl chloride, low-density Polyethylene, polypropylene, and polystyrene;
    a staging step that includes arranging the liner and refrigerator component such that the liner contact structure and component contact structure are in direct contact with each other under pressure and an interface of the component contact structure and liner contact structure circumscribes the aperture, wherein the liner and refrigerator component as arranged form a staged assembly; and
    a welding step that includes applying ultrasonic energy to the staged assembly to weld the liner and refrigerator component together at the interface of the component contact structure and liner contact structure, wherein the liner and refrigerator component as welded together form a liner assembly,
    wherein a hermetic seal is formed at the interface of the liner and refrigerator component by the welding step, wherein the hermetic seal is continuous and extends about an entire perimeter of the aperture.

3. The method of claim 2, wherein the component contact structure comprises a component contact surface, the liner contact structure comprises a liner contact surface, and the staging step includes arranging the component contact surface and liner contact surface to be in direct contact and flush with each other.

4. The method of claim 2, wherein:
    the component contact structure comprises a plurality of ribs, each rib defining a contact edge,
    the liner contact structure comprises a liner contact surface, and
    the staging step includes arranging the contact edge of each rib to be in direct contact with the liner contact surface.

5. The method of claim 2, wherein the refrigerator component comprises:
    a main body defining an interior space and an opening to the interior space, and a flange attached to the main body that extends about a perimeter of the opening, wherein the flange defines the component contact structure of the refrigerator component.

6. The method of claim 2, further comprising a cabinet assembly step that includes arranging the liner assembly within an outer shell, and then injecting an insulating foam into a space between the liner assembly and outer shell.

7. The method of claim 2, wherein the liner is a thermoformed liner, and the refrigerator component is an injection-molded component.

8. The method of claim 7, wherein the providing step includes forming the liner via thermoforming.

9. The method of claim 7, wherein the providing step includes forming the refrigerator component via injection molding.

10. The method of claim 2, wherein the liner and refrigerator component each comprises polystyrene.

11. The method of claim 2, wherein the refrigerator component comprises a wall grommet, an electrical box, an air duct, a water conduit, or a wall anchor.

12. A refrigerator appliance comprising:
a liner assembly including a liner defining a compartment for storing food items and an aperture extending through the liner, and a refrigerator component welded to the liner via ultrasonic welding, wherein the liner and refrigerator component comprise the same type of plastic, the type being one of polyethylene terephthalate, high-density polyethylene, polyvinyl chloride, low-density Polyethylene, polypropylene, and polystyrene;
an outer shell that surrounds the liner assembly; and
foam insulation provided between the liner assembly and outer shell,
wherein a hermetic seal is formed between the liner and refrigerator component by the ultrasonic welding, wherein the hermetic seal is continuous and extends about an entire perimeter of the aperture.

13. The refrigerator appliance of claim 12, wherein:
the refrigerator component comprises a main body defining an interior space, and
the refrigerator component is welded to an exterior surface of the liner such that the interior space of the of the refrigerator component is in communication with the compartment of the liner via the aperture.

14. The refrigerator appliance of claim 12, wherein the liner is formed via thermoforming, and the refrigerator component is formed via injection molding.

15. The refrigerator appliance of claim 12, wherein the liner and refrigerator component each comprises polystyrene.

16. A liner assembly suitable for a refrigerator appliance, the liner assembly comprising:
a liner defining a compartment for storing food items and an aperture extending through the liner; and
a refrigerator component welded to the liner via ultrasonic welding,
wherein the liner and refrigerator component comprise the same type of plastic, the type being one of polyethylene terephthalate, high-density polyethylene, polyvinyl chloride, low-density Polyethylene, polypropylene, and polystyrene, and
wherein a hermetic seal is formed between the liner and refrigerator component by the ultrasonic welding, wherein the hermetic seal is continuous and extends about an entire perimeter of the aperture.

* * * * *